Patented July 19, 1932

1,867,866

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING MIXED FERTILIZER

No Drawing. Application filed December 3, 1926. Serial No. 152,511.

This invention relates to fertilizers and more particularly to a process and apparatus for producing mixed fertilizers.

Heretofore it has been the practice to make up the several fertilizers, such as phosphate, potash and nitrogenous, by separate processes. When it was desired to make the mixed fertilizers, the several fertilizer products were incorporated in the desired proportions. Such methods are uneconomical and time consuming and result in a product in which the two fertilizer ingredients are not thoroughly mixed.

It is an object of this invention to provide a process for manufacturing a mixed fertilizer, all the steps of which are carried out in a single container.

Another object is to prepare a phosphate nitrogen fertilizer by incorporation of nitrogenous material with the phosphate during the preparation of the latter.

A further object is to provide a method for producing a mixed fertilizer in which the ingredients of the several fertilizers are processed simultaneously.

We accomplish these and other objects which will appear hereinafter by treating insoluble phosphate rock with an acid in a novel apparatus and at a proper stage in the process add another fertilizer or fertilizer product.

We have found, as disclosed in our applications Serial Numbers 112,678 and 117,170, that by treating insoluble phosphate with an acid in an autoclave and exercising proper control of temperature and pressure conditions, a very desirable phosphate fertilizer may be obtained.

Our present process contemplates the production of a mixed fertilizer, preferably of phosphate and nitrogenous substances, by the utilization of the apparatus described in the applications referred to. To carry out our process insoluble phosphate rock, ground to a suitable degree of fineness, is admitted to an autoclave, preferably of the horizontal rotary type. The cover is then clamped on the autoclave and by operation of a pump connected to the autoclave through a fluid line, the air may be evacuated. This preliminary evacuation serves to withdraw much of the occluded moisture from the rock dust and insures a quick penetration by the acid. It will be understood that while this preliminary evacuation is desirable in some cases, it is not absolutely essential to the successful operation of the process. Thus we may admit phosphate rock to the container and immediately add the acid or we may add acid to the ground rock and run the resulting sludge into the autoclave.

After the air has been partially withdrawn from the container, a strong mineral acid, such as sulphuric or phosphoric acid, or the components of such acid, are admitted to the autoclave. As already alluded to, the preliminary air evacuation facilitates the penetration of the dust by the acid and thereby accelerates the reaction between these two. We have found that the reaction between the acid and phosphate rock is accelerated by the thorough mixing of the two. The acid sludge may be agitated by means of a stirring mechanism mounted on the cover of the container, or by rotation of the autoclave itself. The agitation of the mix is continued until the acid is thoroughly incorporated with the rock.

As the reaction between the phosphate and acid progresses, certain gaseous products, such as carbon dioxide and hydrogen fluoride are evolved. The amount of evolved gas will depend largely on the chemical composition of the raw material. To prevent excessive autogenous pressure, a relief valve is provided on the cover, which allows the escape of any desired quantity of evolved gases. During the progress of the reaction, considerable heat is generated. The rise in temperature, as is understood, will vary with different raw materials and particularly in respect to the carbonate content of the raw product, since the reaction between the carbonate and sulphuric acid is exothermic. We have found that the reactions occurring in the autoclave may be further accelerated by applying moderate external heat. This may be done in any convenient manner, as by providing gas burners, or other commercial heating apparatus, below the autoclave.

The mass is maintained in the autoclave for a time sufficient to allow complete interaction of the dust and acid. When the reaction has run to completion, the pressure in the autoclave is reduced to atmospheric pressure, by opening the relief valve. At this point we propose to add the nitrogenous product to the fertilizer. To do this we remove the cover of the autoclave and admit a nitrogen fertilizer product, such as ammonium sulphate thereto. The cover is then quickly replaced and the two ingredients mixed by rotating the container for a brief mixing period. A cooling medium, such as cold water or brine, is admitted to the hollow shell of the container and allowed to circulate therethrough. The sudden drop in pressure occasioned by opening the relief valve causes a quick drop in temperature, which initiates crystallization of the phosphate mass. After the nitrogen product has been mixed with the partially crystallized phosphate the second cooling, due to the cooling medium, accelerates further crystallization.

We have found that the process may be additionally shortened. To do this, the cover is replaced on the autoclave and a vacuum pump connected to the container in the manner hereinbefore described. Upon operation of the pump the container is partially evacuated. This air evacuation withdraws the residual gases and in addition causes a further drop in temperature. This second drop in temperature, due to the decreased pressure, serves to completely crystallize the mixture of phosphate nitrogen product.

We prefer to use ammonium sulphate as our nitrogen addition agent because of its relative cheapness and availability. We may use this material in the damp state in our process since the processing in the autoclave serves to crystallize and dry the ammonium sulphate as well as the phosphate. For this reason, a cheaper ammonium compound can be utilized, since the expense of drying prior to addition to the phosphate is avoided.

We may use another and preferred method to further reduce the time required for the drying step. This may be done by gently heating the mass in the autoclave before setting up the final vacuum. This step may be carried out by clamping the cover on the autoclave and heating it by means of the burners hereinbefore described. This heat treatment will tend to vaporize any moisture which may be occluded in the products. It will be understood that, at this point, the temperature should be carefully regulated and should not be allowed to become great enough to decompose the ammonium salt. It is advisable, for this reason, to keep the temperature well below 140° C.

While we prefer to use ammonium sulphate as our nitrogen containing agent, it will be appreciated that the process is not inherently limited to this substance. In place of this we may use other compounds containing agriculturally available nitrogen, such as comminuted organic ammoniate or sodium nitrate. It will be appreciated also that if desired, we may add agriculturally available potassium to the phosphate together with the nitrogenous compound.

It will now be appreciated that we have provided a process for producing a mixed fertilizer which may be carried out in a single container. We are enabled for this reason to effectively utilize heat and pressures to treat damp nitrogen compounds and thus eliminate a costly separate drying step for these addition agents. The final product produced by our process has a very low moisture content and is of a highly porous and friable structure which enables it to be ground to a fine powder and thereby renders it easily assimilable by plants.

We claim:

1. A process of preparing mixed fertilizer comprising mixing unavailable phosphatic material with a strong mineral acid, passing the substantially unset mixture to a zone in which pressure may be maintained and the exothermic heats largely retained, digesting the mixture in said zone under controlled superatmospheric temperature and pressure while agitating the mass, relieving the pressure, adding a nitrogen containing fertilizing material to the mixture in said zone, continuing to agitate the mass and cooling to effect crystallization and drying of the mixture.

2. A process of preparing mixed fertilizer comprising mixing unavailable phosphatic material with a strong mineral acid, passing the substantially unset mixture to a zone in which pressure may be maintained and the exothermic heats largely retained, digesting the mixture in said zone under controlled superatmospheric temperature and pressure while agitating the mass, relieving the pressure, adding a nitrogen containing fertilizing material to the mixture in said zone, continuing to agitate the mass, reducing the pressure in said zone below atmospheric to effect crystallization and drying of the mixture.

3. A process of preparing mixed fertilizer comprising mixing unavailable phosphatic material with a strong mineral acid, passing the substantially unset mixture to a zone in which pressure may be maintained and the exothermic heats largely retained, digesting the mixture in said zone under controlled superatmospheric temperature and pressure while agitating the mass, relieving the pressure, adding a nitrogen containing fertilizing material to the mixture in said zone, continuing to agitate the mass, heating the mixture to a temperature high enough to vaporize the water content of the mixture but low enough to avoid decomposition of the nitrogen containing fertilizer, and then reducing the pressure in said zone below atmospheric to effect crystallization and drying of the mixture.

4. A process of manufacturing mixed fertilizers comprising mixing ground phosphate rock and a strong mineral acid, digesting the mixture while mechanically agitating it in a confined space under autogenous superatmospheric pressure and superatmospheric temperature for a period of time sufficient to effect a substantial conversion of the unavailable phosphates to available phosphates, releasing the pressure in said confined space, adding a nitrogen containing fertilizer to the mixture, cooling the mass to effect crystallization and drying, and continuing the mechanical agitation throughout the process.

5. A process of manufacturing mixed fertilizers comprising mixing ground phosphate rock and a strong mineral acid, digesting the mixture, while mechanically agitating it in a confined space under autogenous superatmospheric pressure and superatmospheric temperature for a period of time sufficient to effect a substantial conversion of the unavailable phosphates to available phosphates, releasing the pressure in said confined space, adding a nitrogen containing fertilizer to the mixture, reducing the pressure in said confined space to below atmospheric to effect crystallization and drying of the mixture, and continuing the mechanical agitation throughout the process.

6. A process of manufacturing mixed fertilizers comprising mixing ground phosphate rock and a strong mineral acid, digesting the mixture, while mechanically agitating it in a confined space under autogenous superatmospheric pressure and superatmospheric temperature for a period of time sufficient to effect a substantial conversion of the unavailable phosphates to available phosphates, releasing the pressure in said confined space, adding a nitrogen containing fertilizer to the mixture, heating the mass to a temperature high enough to vaporize the water content but low enough to avoid decomposition of the nitrogen containing fertilizer, and then reducing the pressure in said confined space below atmospheric to effect crystallization and drying of the mixture, and continuing to mechanically agitate the mass during the process.

In testimony whereof we affix our signatures.

BEVERLY OBER.
EDWARD HYATT WIGHT.